United States Patent [19]

Olson

[11] 4,070,222
[45] Jan. 24, 1978

[54] PRETREATMENT OF THERMOPLASTIC FILM FOR IMPROVED SEALING

[75] Inventor: Robert H. Olson, Pittsford, N.Y.

[73] Assignee: Mobil Oil Corporation, New York, N.Y.

[21] Appl. No.: 773,711

[22] Filed: Mar. 2, 1977

[51] Int. Cl.² .......................... B32B 31/00; B65C 9/25
[52] U.S. Cl. .................................... 156/251; 156/322; 156/497; 156/515
[58] Field of Search .............. 156/251, 271, 515, 73.3, 156/497, 82, 322

[56] References Cited

U.S. PATENT DOCUMENTS

| | | | |
|---|---|---|---|
| 2,805,700 | 10/1957 | Klasing et al. | 156/251 |
| 2,990,875 | 7/1961 | Samuels et al. | 156/251 |
| 3,156,010 | 11/1964 | Osborn, Jr. | 156/515 |
| 3,269,278 | 8/1966 | Olstad | 156/271 |
| 3,749,635 | 7/1973 | Lagain | 156/251 |
| 3,839,126 | 10/1974 | Haller | 156/322 |

Primary Examiner—Douglas J. Drummond
Attorney, Agent, or Firm—Charles A. Huggett; James D. Tierney

[57] ABSTRACT

A method is provided for the pretreatment of superposed layers of thermosplastic film which are to be heat sealed together, longitudinally, along a predetermined area. The film layers to be heat sealed are preheated utilizing heated air along a defined, continuous longitudinally extending area of the film layers. The preheated area is subsequently passed through a slit-seal device which simultaneously severs the preheated film layers and seals the severed edges together. The method is particularly useful for the slit-sealing of a continuously advancing flattened tube of thermoplastic which is characterized by having a non-uniform gauge in cross-section.

4 Claims, 1 Drawing Figure

PRETREATMENT OF THERMOPLASTIC FILM FOR IMPROVED SEALING

BACKGROUND OF THE INVENTION

1. Field of the Invention

This invention relates to a novel system for the production of tubes of thin gauge thermoplastics and, more specifically, relates to a system for continuously preheating a continuously advancing flattened tube of thermoplastic material in an area which is subsequently subjected to slitting and sealing whereby a plurality of tubes are produced from a single tube.

2. Description of the Prior Art

U.S. Pat. No. 3,156,010, the disclosure of which is incorporated herein by reference, discloses a method and apparatus which may be employed for slit-sealing a continuously advancing flattened tube of a thermoplastic material whereby a plurality of individual tubes are formed. As the patent discloses, a single, continuously advancing, flattened tube is passed directly into the path of a heated wire, the heated wire serving to simultaneously slit and seal the edges of the tubes being formed. Instead of utilizing a heated wire other slit-seal elements may be employed such as a hot knife or razor to effect the slit-sealing of the tube. When the thermoplastic film which forms the tube which is being treated, i.e., slit-sealed, is of substantially uniform gauge, such prior art slit-sealing devices perform generally satisfactorily. However, when the gauge of the film is not uniform and, for example, if the film is a profile extrusion characterized by having ribs (as for example the ribbed film product disclosed in U.S. Pat. No. 3,984,047, the disclosure of which is incorporated herein by reference) or thickened areas running longitudinally thereof the ribs serve to prevent (mechanically) the superposed layers of film from being completely sealed at their edges when such prior art slit-seal devices are employed. The individual ribs running against and across the slit-seal element cause the film layers to flutter forcing them further apart and results in poor seal formation evidenced by pin holes in the seal or even resulting in the formation of extremely weak or open seals, i.e., lengths of film in the seal area which are completely unsealed.

SUMMARY OF THE INVENTION

Applicant has now found that when flattened tubular film characterized by having longitudinally extending ribs or thickened areas integral with film is continuously preheated in that area of the continuously advancing tube which is to be subjected to the slit-seal operation that good, strong, uniform seals are produced and the rib elements in the film do not detract from the uniform quality of the seal. Accordingly, applicant has provided a method for continuously slit-sealing an advancing flattened tube of thermoplastic film. The method comprises locally preheating the advancing tube only in that area of the tube which comes into contact with the slit-sealing device and, subsequently, continuously slitting and sealing the tube to form a plurality of tubes from a single tube.

BRIEF DESCRIPTION OF THE DRAWINGS

The FIGURE is a schematic illustration, partly in section, of an embodiment of one form of an apparatus which may be employed to perform the novel method of the present invention.

DESCRIPTION OF SPECIFIC EMBODIMENTS

Figure 1:
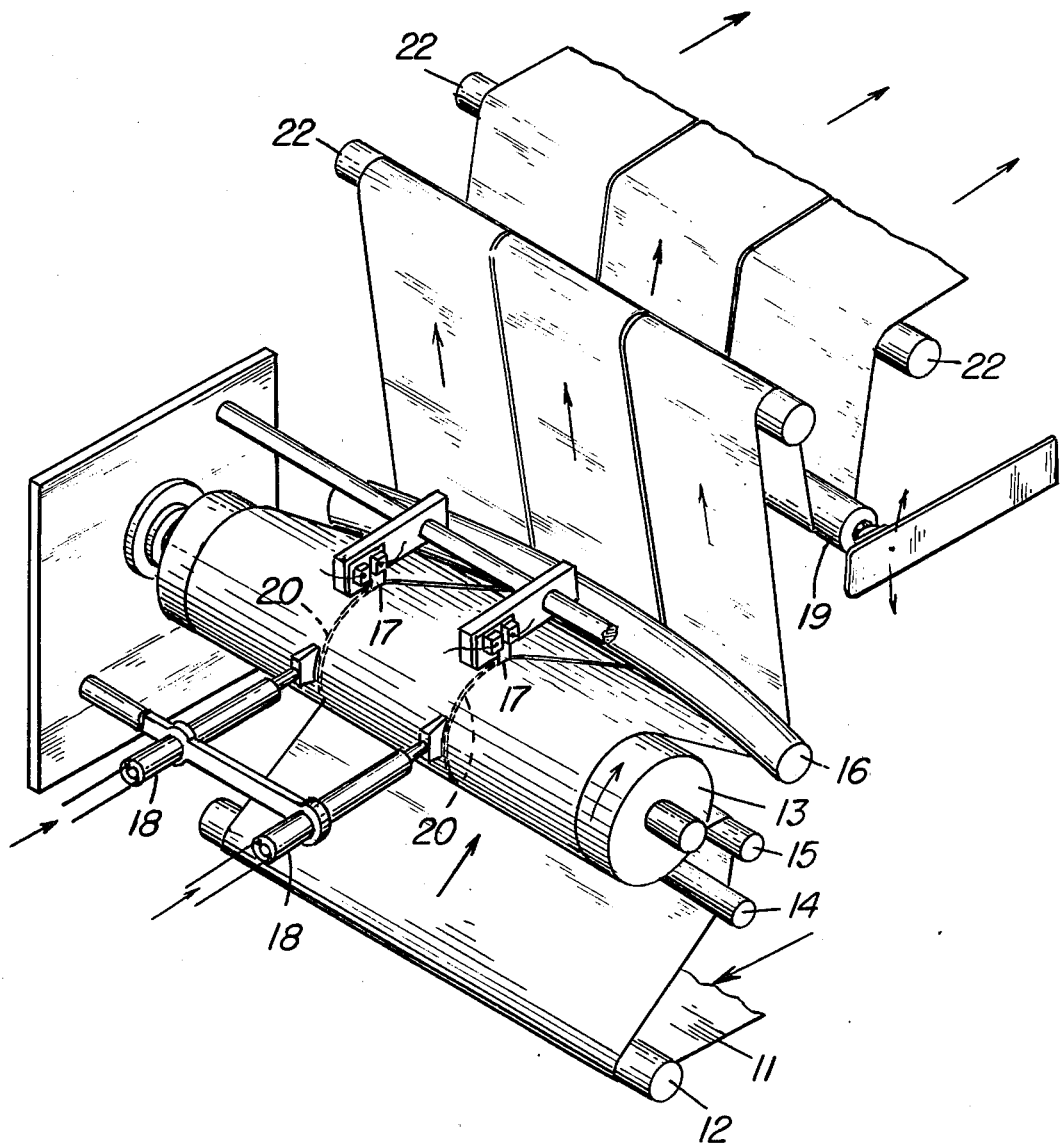

It will be understood that, although in a preferred embodiment the apparatus and method of the present invention is employed with films which have an irregular cross section such as the ribbed film as hereinbefore described, the present invention is also operable with, and improves the slit-sealing characteristics of thermoplastic film which is relatively uniform in cross section. In the case of the ribbed film, the preheat treatment of the present invention makes the ribs much more plastic and pliable thereby eliminating or substantially reducing the tendency of the film layers to flutter and separate during the slit sealing step. The preheat step causes a reduction of stiffness in the film layers which result in less mechanical disruption of the film during and after the slit-sealing step. The present preheat treatment also results in a reduction in the amount of heat that must be transferred quickly to the film layers when the slit-seal blade contacts and severs the film layers. In certain instances the preheating effects a blocking together of the two film layers in the preheat area which improves the resistance to mechanical separation of the film layers during the slit-sealing and subsequent cooling of the resultant seal. It is also noted that the preheat treatment results in an increase in plasticity of the film layers which in turn reduces the stress which is set up in the film layers during the slit-sealing step.

A wide variety of techniques may be employed to preheat the continuously advancing flattened tube in a localized area such as, for example, open flame preheating (with, for example, a propane torch) or conduction heating of the film by contacting the continuously advancing film with heated rollers, for example. However, a preferred technique has been found to be the employment of a heated air stream. In accordance with the method of this invention the thermoplastic surfaces which are to be slit-sealed are contacted with at least a single stream of a hot inert gas. The gas treated thermoplastic surfaces, while still at an elevated temperature, are then brought into contact with the slit-seal element to effectuate a slit-sealing of the flattened tube in the gas treated area. An inert gas is any gas which does not produce an adverse physical or chemical effect upon the surfaces to be slit-sealed and includes gases such as air, nitrogen and argon. The term "thermoplastic" is intended to encompass all of the common thermoplastic films which are used in the packaging art such as, for example, polyethylene, polypropylene, polybutane, polyvinylchloride, ethylenevinyl acetate copolymers and the like and blends and copolymers thereof.

The stream of hot gas impinging upon the thermoplastic tube surface is preferably in the shape of a thin flat ribbon being substantially parallel to the direction of the advancing flattened tube. The velocity of the impinging stream of hot gas and its temperature are, of course, dependent upon the rate of linear advancement of the flattened tube as well as the material of construction of the tube itself and the thickness of the tube layers. In case of polyethylene film having a gauge of approximately 0.9 mil. and advancing at a rate of about 300 feet/minute, the preferred hot gas temperature is from about 700° F. to about 750° F.

The dimensions of the impinging hot gas stream can be carefully controlled by the use of appropriately designed nozzles and suitable apparatus so as to insure that only the area of the flattened tube which is to be subsequently slit-sealed is exposed to heat. Suitable hot gas preheat elements are commercially available and include elements such as those identified by the manufacturer as Flameless Electric Torch-Serpentine II. Such a device employs internally disposed electric resistant elements which preheat incoming air under pressure. It comprises 150 inches of coiled resistance filament in an 8 inch quartz tube. It is capable of heating a cold incoming gas flowing at 150 cu. ft/hr. up to 1600° F.

In one specific embodiment of the present invention it has been found that when a flattened tube of polyethylene film having a single wall thickness of about 0.9 mils is advancing at a rate of about 300 ft. per min., about 1000 watts of power is required to produce an air preheat temperature of 720° F. A flared nozzle is fitted on the end of the preheater which has outlet slot dimensions of 0.045 by 3 inches, the end of the nozzle being positioned about 150 above the film surface and several inches in advance of the slit-sealer blade.

Referring now in particular to FIG. 1 it can be seen that a flat tube of film 11 is fed around idler roll 12. The flattened tube 11 may be supplied from a supply roll of flattened tubular stock or, in the case of an in line operation, may be fed to idler roller 12 directly from a tubular extrusion operation. The flattened tube is subsequently threaded around roller 14 and 15 onto the lower surface of slotted roll 13. Slotted roll 13 is characterized by having continuous circumferential grooves or slots 20 around its circumference which are designed to accommodate the positioning of slit-seal elements therein. As flattened tube 11 advances around slotted roll 13 two spaced apart longitudinal areas thereof are exposed to the heated air emanating from preheat elements 18. In the instance of the embodiment shown in FIG. 1, three separate tubes are being formed from a single tube so that two preheat stations and two slit-seal stations are required. It will be obvious that this arrangement may be modified so that either a single preheat and slit-seal station are employed in the case where it is desired to form two tubes from a single tube or, a multiplicity of preheat and slit-seal stations may be employed depending upon the number of tubes it is desired to produce from the single tube.

As shown in FIG. 1 as the locally preheated advancing tube 11 passes the preheat elements it is immediately fed to, electrically heated, slit-seal blade 17 which slits apart and simultaneously seals together the slit apart edges of the preheat tube to thereby form separate tubes.

In the case illustrated in FIG. 1 three separate tubes are produced which, after passing under a curved varibow roller 16 to assist in spacing apart the individual tubes, are passed over idler rolls 22. A conventional dancer-roll assembly 19 is used to control the tension. The individual tubes are subsequently passed through driven take-up rollers (not shown) and on to bag making machinery (not shown) or on to further processing such as gusseting, wind-up operations, or the like.

A better understanding of the present invention may be had from the following Examples which are intended only to illustrate specific embodiments of the present invention and accordingly should not be construed in a limiting sense.

In the following Examples, rolls of flattened, tubular, longitudinally-ribbed, film having a 0.9 mil. equivalent gauge by weight were slit sealed. The polyethylene resin employed to produce the ribbed tubular film stock was identified by manufacturer as Norchem 350, a low density polyethylene resin having a melt index of 2.0 and a density of 0.922.

EXAMPLE I

Ribbed tubular film stock 11 was threaded over idler rollers 12, 14 and 15 as shown in FIG. 1. The flattened tubular ribbed film was wrapped around heated slit seal roller 16, about half its circumference. Subsequently, the film was fed from roller 13 and passed through dancer roll assembly 19 which maintained a constant tension on the film during the slit sealing operation. Powered draw rollers (not shown) were controlled to feed and withdrawn the film from the slit seal apparatus at a constant speed of 305 ft./min. The current flow to slit sealer blade 17 was adjusted to 85 amperes by adjusting the voltage applied to a power transformer (not shown) to 130 volts. The resultant slit seals made in the flattened tubular ribber film were unacceptable and were found to be weak and completely unsealed in some areas where ribs would cross and/or come into contact with slit seal blade 17. The seals, when tested for tensile strength on a commercially available tester were identified by the manufacturer as Thwing Albert No. QC Electronic Tensile Tester, gave the following average results:

Right Seal Area — 1.27 lbs.–346% elongation
Left Seal Area — 1.21 lbs.–323% elongation
Film Before Sealing — 1.72 lbs.–520% elongation

EXAMPLE II

Flattened tubular ribbed film 11 was threaded through the slit seal apparatus as shown in FIG. 1, identical to the same manner as described in Example I and controlled at the same speed, i.e. — 305 ft/min. The current flow to the slit seal blade 17 was adjusted to 85 amperes by adjusting the voltage applied to the power transformer (not shown) to 137 volts. Pre-heater element 18 was actuated by adjusting air flow through elements 18 by means of a pressure regulator (not shown) in the supply line which was set at 17.5 psig. The current flow in the pre-heater assembly 18 was set at 8.0 amperes, equivalent to 1033 watts. A thermocouple (not shown) which was positioned in the hot air stream just before its impingement on the surface of the continuously advancing film 11 indicated a temperature of 718° F. The resultant slit seals were strong and continuous, i.e. — non-interrupted as in the case of the heat seals formed in above Example I, both in the valleys, i.e. non-ribbed areas, and where the ribs crossed the seal.

Average tensile analysis showed a substantial improvement in seal strength over the seals which were made without preheat in Eample I and were characterized by having no unsealed area.

Right Seal Area — 1.50 lbs. - 443% elongation
Left Seal Area — 1.50 lbs. - 445% elongation
Film Before Sealing — 1.72 lbs. - 520% elongation It will be obvious from the above Examples that utilizing the pre-heater device described in the foregoing specification, that film seals made during a slit-seal operation are far superior to those made in the absence of any preheating.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for slit-sealing a continuously advancing flattened tube of thermoplastic film which comprises sequentially:
   a. locally preheating said tube along at least one continuously extending longitudinally area utilizing heated air, said preheating being insufficient to cause said flattened tube to be heat welded together; and
   b. subsequently subsequently continuously slitting and sealing said flattened tube within said preheated longitudinal area thereby forming a plurality of individual tubes.

2. A method in accordance with claim 1 wherein said flattened tube of thermoplastic film is characterized by having continuous, spaced-apart ribs formed therein.

3. An apparatus for continuously preheating and subsequently slit-sealing a flattened tube of thermoplastic film comprising means for continuously advancing said tube, and hot air means for preheating below the sealing temperature of said tube along a defined longitudinal area and subsequently slit-sealing means for simultaneously dividing and sealing said tube in said preheated area.

4. An apparatus in accordance with claim 3 wherein said flattened tube of film is characterized by having continuous, spaced-apart, ribs formed therein.

* * * * *